Feb. 16, 1937.  W. BUHROW  2,070,825

ARTIFICIAL PALM

Filed Sept. 23, 1936

Inventor
William Buhrow

Patented Feb. 16, 1937

2,070,825

UNITED STATES PATENT OFFICE 2,070,825

ARTIFICIAL PALM

William Buhrow, Minneapolis, Minn.

Application September 23, 1936, Serial No. 102,217

3 Claims. (Cl. 41—15)

The object of this invention is to provide novel means for holding palm leaves in the making of an artificial palm plant, a close approach to the appearance of the natural plant being achieved.

Figure 1:
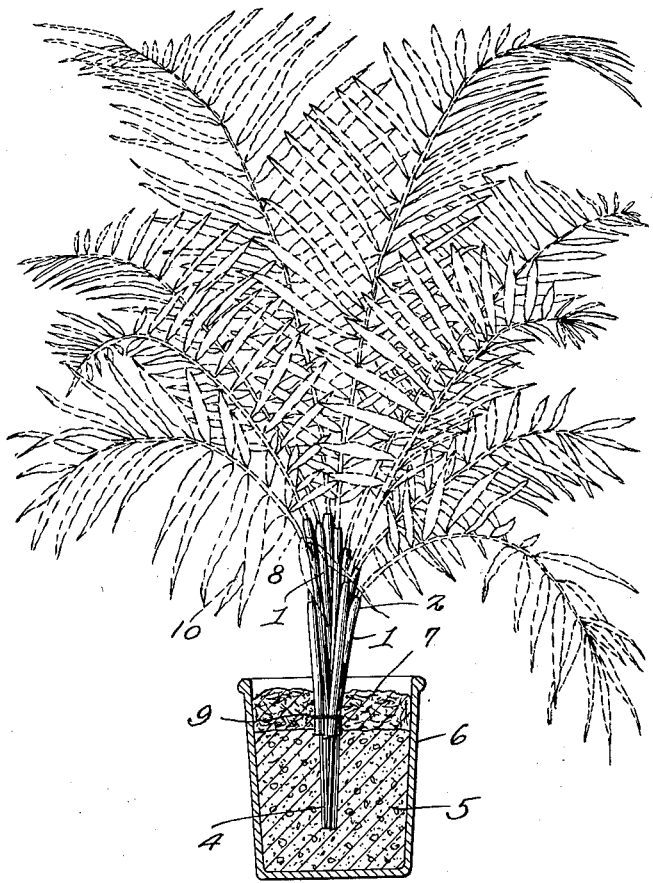
Figure 2:
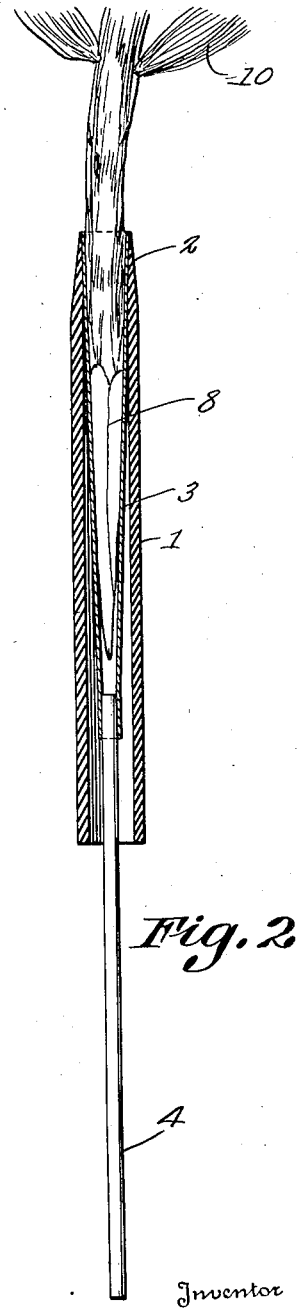

Fig. 1 shows in vertical section, the complete plant, and Fig. 2 is a longitudinal section of holder.

Pieces 1 of resilient tubing, constituting covers, made of rubber if desired, colored and shaped to simulate the stem of a palm leaf, and tapered at their upper ends as shown at 2, the more closely to resemble a palm leaf stem, are slipped over and house acutely tapered metal cups 3, in the lower, reduced ends of which, supporting prongs 4 are secured. The holders thus formed may be bound together in a bundle, as shown at 9, the prongs 4 being inserted into a mass 5 of cement disposed, in a plastic condition, in a container or pot 6. When the mass 5 of cement has set, it may be covered with a layer 7 of moss, the better to approximate the appearance of a growing palm plant.

The stems 8 of the palm leaves 10 are wedged and held securely but renewably in the tapered cups 3. The tapering of the cups 3 serves two purposes, in that it gives the cups a good hold on the stems 8 and also enables the covers 1 to be slipped readily over the cups, the covers having a tight frictional grip on the upper portions of the cups.

Among the advantages of the structure are the following. Any number of the holders shown in Fig. 2 may be mounted in the mass 5 of cement, thereby regulating the size of the plant produced. The holders of Fig. 2 may be inclined laterally, as desired, to give the palm leaves 10 a droop which will produce a symmetrical and naturally-appearing plant. The covers 1, owing to their construction and coloring, represent closely the natural appearance of the stem of the plant leaf. The binder 9 may be omitted if the manufacturer wishes.

Having thus described the invention, what is claimed is:

1. A holder for use in making an artificial plant, comprising a tapered cup a tubular cover housing and securely mounted on the cup, and a prong secured to the lower end of the cup and extended below the lower end of the cover, the cover being so constructed as to simulate the stem of a leaf of the plant selected.

2. A device of the class described, constructed as set forth in claim 1, and wherein the cover is tapered in thickness toward its upper end and grips the cup closely.

3. The holder of claim 1, in combination with a container and a mass of cement in the container, the prong being mounted in the cement, and the cement being plastic at the time the prong is mounted in the cement, thereby to enable the holder to have any desired lateral slant and to give, thereby, any desired droop to the leaf which is mounted in the cup.

WILLIAM BUHROW.